(12) United States Patent
Nicas et al.

(10) Patent No.: US 9,762,634 B2
(45) Date of Patent: Sep. 12, 2017

(54) SYSTEM AND METHOD TO TRANSMIT DIGITAL BROADCAST GRADE VIDEO VIA A CELLULAR DATA NETWORK (75) Inventors: Nicholas Angelo Nicas, Blue Springs, MO (US); Frank Robert Coppa, Kansas City, MO (US); Larry Kennedy, Lawrence, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 587 days.

(21) Appl. No.: 13/441,341

(22) Filed: Apr. 6, 2012

(65) Prior Publication Data

US 2013/0265446 A1    Oct. 10, 2013

(51) Int. Cl.
| | |
|---|---|
| H04N 21/60 | (2011.01) |
| H04N 5/225 | (2006.01) |
| H04L 29/06 | (2006.01) |
| H04N 21/2187 | (2011.01) |
| H04N 21/2381 | (2011.01) |
| H04N 21/6437 | (2011.01) |
| H04N 21/647 | (2011.01) |

(52) U.S. Cl.
CPC ........ *H04L 65/4076* (2013.01); *H04L 65/602* (2013.01); *H04N 21/2187* (2013.01); *H04N 21/2381* (2013.01); *H04N 21/6437* (2013.01); *H04N 21/64738* (2013.01)

(58) Field of Classification Search
None
See application file for complete search history.

(56) References Cited

U.S. PATENT DOCUMENTS

| | | | | |
|---|---|---|---|---|
| 6,047,322 | A * | 4/2000 | Vaid | H04L 1/1854 370/449 |
| 6,449,259 | B1 * | 9/2002 | Allain | H04L 12/66 370/238 |
| 6,502,131 | B1 * | 12/2002 | Vaid | H04L 1/1854 709/224 |
| 6,600,732 | B1 * | 7/2003 | Sevanto | H04L 12/5895 370/349 |
| 6,690,646 | B1 * | 2/2004 | Fichou | H04L 41/0896 370/231 |
| 6,765,873 | B1 * | 7/2004 | Fichou | H04L 12/5695 370/230 |

(Continued)

OTHER PUBLICATIONS

Song et al., "A Network Selection Mechanism for Next Generation Networks", Communications 2005, ICC 2005, vol. 2. IEEE 2005.*

(Continued)

*Primary Examiner* — Mohammad J Rahman
(74) *Attorney, Agent, or Firm* — Toler Law Group, PC (57) ABSTRACT

A particular method includes receiving a media stream that includes digital broadcast grade video. The method further includes compressing the media stream to form a compressed digital media stream using a Joint Photographic Experts Group 2000 compliant compression coding system. The method further includes converting the compressed digital media stream into data packets. The method further includes selecting a cellular data network from a plurality of available cellular data networks based on one or more quality of service factors. The method further includes transmitting the data packets via the cellular data network.

20 Claims, 4 Drawing Sheets

(56) References Cited

U.S. PATENT DOCUMENTS

| | | | |
|---|---|---|---|
| 6,775,267 B1* | 8/2004 | Kung | H04L 12/14 370/352 |
| 7,899,451 B2* | 3/2011 | Hu | H04W 48/17 370/328 |
| 7,948,933 B2 | 5/2011 | Ohayon et al. | |
| 8,819,757 B2* | 8/2014 | Rivera | 725/131 |
| 8,892,720 B2* | 11/2014 | Diaz | H04L 12/40013 709/218 |
| 9,072,005 B2* | 6/2015 | Walker | H04W 28/16 |
| 2001/0053145 A1* | 12/2001 | Willars | H04L 12/4604 370/352 |
| 2002/0059170 A1* | 5/2002 | Vange | G06F 9/5027 |
| 2002/0095493 A1* | 7/2002 | Byrnes | H04L 45/02 709/224 |
| 2003/0038897 A1* | 2/2003 | Shiotsu | 348/725 |
| 2003/0058827 A1* | 3/2003 | Chow | H04L 12/66 370/338 |
| 2005/0152300 A1* | 7/2005 | Edsberg | H04B 7/18532 370/316 |
| 2005/0215848 A1* | 9/2005 | Lorenzato | 600/27 |
| 2005/0233728 A1* | 10/2005 | Karaoguz | H04L 12/5695 455/406 |
| 2006/0045069 A1* | 3/2006 | Zehavi et al. | 370/352 |
| 2006/0128422 A1* | 6/2006 | van Rooyen | H04H 20/24 455/552.1 |
| 2007/0139168 A1* | 6/2007 | Rennie | G08G 1/017 340/425.5 |
| 2007/0162981 A1* | 7/2007 | Morioka | H04L 63/0428 726/30 |
| 2007/0226313 A1* | 9/2007 | Li | G11B 20/12 709/217 |
| 2008/0075031 A1* | 3/2008 | Ohayon | H04N 21/2187 370/316 |
| 2008/0219326 A1* | 9/2008 | Santhoff | H04L 1/0045 375/141 |
| 2008/0235745 A1* | 9/2008 | Edwards | H04L 12/66 725/110 |
| 2008/0298313 A1* | 12/2008 | Salminen | H04L 63/08 370/329 |
| 2009/0189828 A1* | 7/2009 | Shmulevich et al. | 343/876 |
| 2009/0189981 A1* | 7/2009 | Siann et al. | 348/143 |
| 2009/0191858 A1* | 7/2009 | Calisti | H04L 12/5695 455/422.1 |
| 2009/0296641 A1* | 12/2009 | Bienas et al. | 370/329 |
| 2010/0045773 A1* | 2/2010 | Ritchey | 348/36 |
| 2010/0048242 A1* | 2/2010 | Rhoads | G06F 17/30244 455/556.1 |
| 2010/0185731 A1* | 7/2010 | Wu | H04L 1/1887 709/204 |
| 2010/0214916 A1* | 8/2010 | Wu | H04L 12/2801 370/230 |
| 2010/0227611 A1* | 9/2010 | Schmidt et al. | 455/434 |
| 2010/0299703 A1 | 11/2010 | Altman | |
| 2011/0002314 A1* | 1/2011 | Choi et al. | 370/338 |
| 2011/0034176 A1* | 2/2011 | Lord | G06F 17/30244 455/450 |
| 2011/0096168 A1* | 4/2011 | Siann et al. | 348/158 |
| 2011/0212717 A1* | 9/2011 | Rhoads | G06F 17/30241 455/420 |
| 2011/0225308 A1* | 9/2011 | Yamaura | H04L 29/12028 709/228 |
| 2011/0228749 A1* | 9/2011 | Taghavi Nasrabadi et al. | 370/338 |
| 2011/0243553 A1* | 10/2011 | Russell | G06Q 30/0631 398/25 |
| 2011/0268197 A1* | 11/2011 | Evans et al. | 375/240.26 |
| 2011/0298638 A1* | 12/2011 | Groeneweg | G08G 1/096775 340/905 |
| 2011/0310851 A1* | 12/2011 | Klingenbrunn | H04W 76/041 370/332 |
| 2012/0007998 A1* | 1/2012 | Mottur et al. | 348/211.2 |
| 2012/0089727 A1* | 4/2012 | Raleigh | H04L 12/14 709/224 |
| 2012/0222092 A1* | 8/2012 | Rabii | H04N 21/41407 726/4 |
| 2012/0236717 A1* | 9/2012 | Saska et al. | 370/235 |
| 2012/0278464 A1* | 11/2012 | Lehane | H04L 12/1407 709/223 |
| 2013/0041808 A1* | 2/2013 | Pham et al. | 705/39 |
| 2013/0128947 A1* | 5/2013 | Fryer et al. | 375/240.01 |
| 2013/0132789 A1* | 5/2013 | Watford | H04L 1/0041 714/752 |
| 2013/0156091 A1 | 6/2013 | Li et al. | |
| 2013/0169546 A1* | 7/2013 | Thomas et al. | 345/173 |
| 2013/0304616 A1* | 11/2013 | Raleigh | G06Q 20/145 705/34 |
| 2014/0080428 A1* | 3/2014 | Rhoads | G06F 17/30241 455/88 |
| 2014/0160973 A1* | 6/2014 | Ho | H04B 7/08 370/252 |
| 2015/0141033 A1* | 5/2015 | Poltorak et al. | 455/452.2 |
| 2016/0105915 A1* | 4/2016 | Zhang | H04W 48/12 370/329 |

OTHER PUBLICATIONS

NPL_CellularNetwork_Google.*
Jachetta, Jim, "Video over IP on the Corporate and Public Network," VidOvation Corporation, Jan. 7, 2010, 82 pages.
Murra, Fabio, "Live event TV: the efficiency & flexibility challenges," www.ibeweb.com, Nov./Dec. 2011, pp. 42-45.
"Bonded 3G: 4GLTE, 3G, WiMax, Wi-Fi," liveu.tv <http://www.liveu.tv/technology.html> 3 pages.
"DLC300: 3G-SDI Multi-Rate Digital Video Transmitter/Receiver/Repeater Module," Artel Video Systems, www.artel.com, 2 pages.
"DL4000 Video Transport System," Artel Video Systems, <http:www.artel.com/dl-4000-networking.php> retrieved Feb. 21, 2012, 2 pages.
"LiveU White Paper," LiveU, <Cellular-uplinking-white-paper-LiveU.doc> 7 pages.
"LU40i Series," LiveU, <http:www.liveu.tv/LU40i.html> retrieved Feb. 21, 2012, 2 pages.
"LU-60 HDA: The Ultimate Transmission System for Professional News Gathering over Multiple Bonded Wireless Networks," LiveU, <http://www.liveu.tv/Pages/FileManager/FileManager/UserFiles/RightStagesAssets/LiveU%20LU60_HDA_Oct11_Web_V6.pdf> 2 pages.
"Teradek CUBELETS 150/350 HD-SDI Camera-Top h.264 Encoder & Decoder Kit w/Dual Band (2.4/5.8 GHz) WiFi/ USB/ Mic Input," <http://www.markertek.com/Video-Equipment/Video-Processors/H264-Video-Encoders-Decoders/Teradek-LLC/CUBE-150-350.xhtml>, 1 page.

* cited by examiner

SYSTEM AND METHOD TO TRANSMIT DIGITAL BROADCAST GRADE VIDEO VIA A CELLULAR DATA NETWORK

FIELD OF THE DISCLOSURE

The present disclosure is generally related to transmission of digital broadcast grade video.

BACKGROUND

A media broadcaster may provide media content, such as media coverage of events and news, in real-time from a remote location to viewers of a television network. The remote location may not support a direct data communication connection to a host location (e.g., a broadcast station or a television studio) that supports transmission of the media content as digital broadcast grade video. Whether the media broadcaster can transmit media content in real-time from the remote location to the host location as the digital broadcast grade video depends in part on the type of data communication connection utilized for transmission.

The type of data communication connections that may allow transmission from the remote location may include a "line of sight" connection (e.g., a point-to-point microwave connection and a satellite uplink/downlink connection), a point-to-point fiber video circuit connection, a terrestrial connection supporting video signal to SONET multiplexing, and an internet protocol terrestrial network connection. In a transmission system that utilizes a line of sight connection, a transmitting antenna associated with a transmitting video camera may utilize an unobstructed line of sight with a relay satellite or a microwave relay station for transmission. In a transmission system that utilizes the point-to-point fiber video circuit connection, transmission is limited by a geographic location of hardware associated with connections of the point-to-point fiber video circuit.

DETAILED DESCRIPTION

In a particular embodiment, a method includes receiving a media stream that includes digital broadcast grade video. The method further includes compressing the media stream to form a compressed digital media stream using a Joint Photographic Experts Group 2000 (J2K) compliant compression coding system. The method further includes converted the compressed digital media stream into data packets. The method further includes selecting a cellular data network from a plurality of available cellular data networks based on one or more quality of service factors. The method further includes transmitting the data packets via the selected cellular data network.

In another particular embodiment, a computer-readable medium is disclosed that includes operational instructions that, when executed by a processor, cause the processor to perform a method including receiving a media stream that includes digital broadcast grade video. The method further includes compressing the media stream to form a compressed digital media stream using a J2K compliant compression coding system. The method further includes converting the compressed digital media stream into data packets and causing the data packets to be transmitted via a cellular data network.

In another particular embodiment, a system includes a processor and a memory accessible to the processor. The memory includes instructions that, when executed by the processor, cause the processor to perform a method that includes receiving a media stream that includes digital broadcast grade video. The method further includes compressing the media stream to form a compressed digital media stream using a J2K compliant compression coding system. The method further includes converting the compressed digital media stream into data packets and causing the data packets to be transmitted via a cellular data network.

Figure 1:
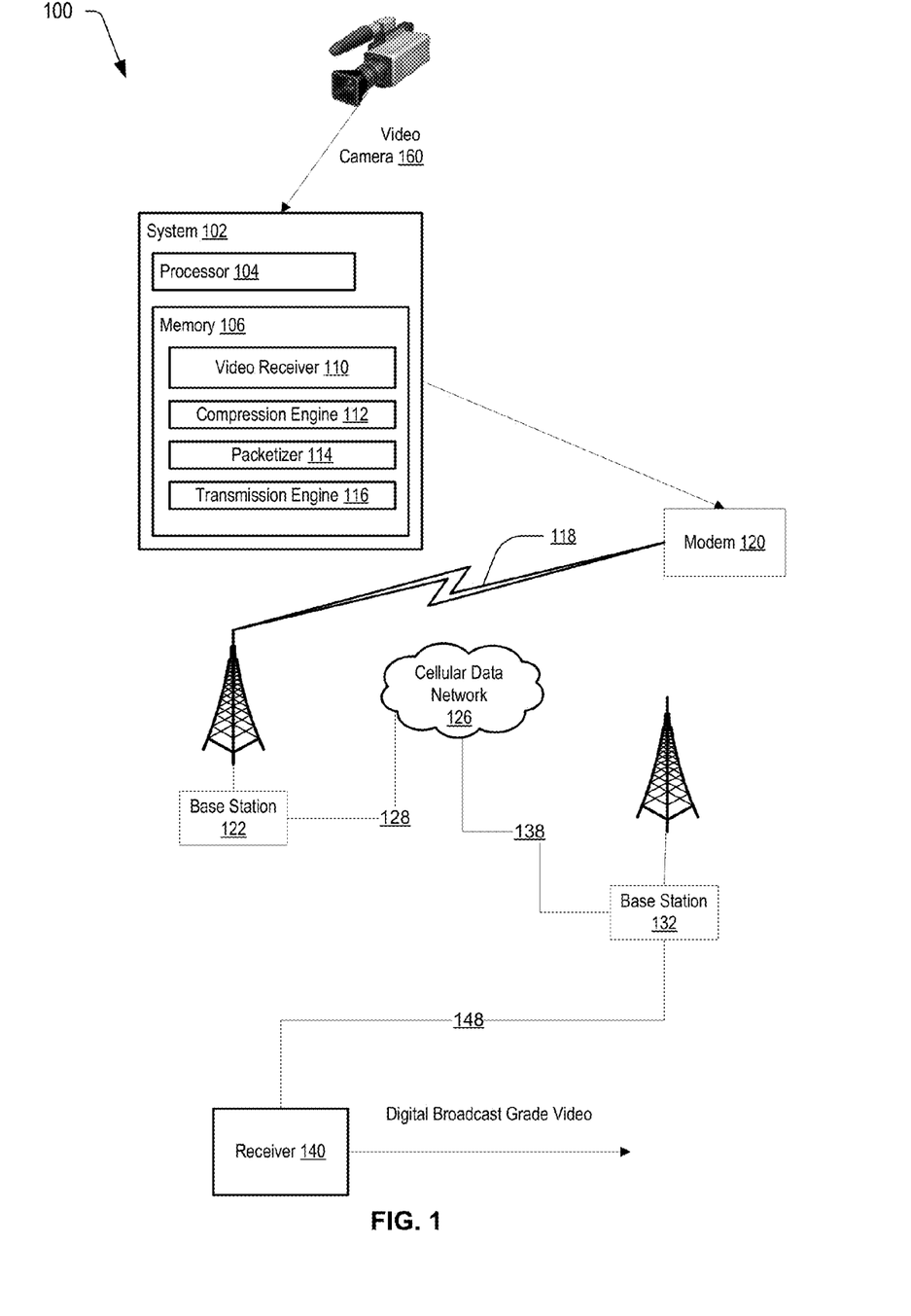
FIG. 1 is a diagram of a particular embodiment of a system to transmit digital broadcast grade video.

Referring to FIG. 1, a particular embodiment of a system to transmit digital broadcast grade video is illustrated and is designated 100. The system 100 includes a video transmission system 102 that includes a processor 104 and a memory 106 that is accessible to the processor 104. The video transmission system 102 may be integrated with a video camera 160, may be a separate computing device attached to the video camera 160, or may be another component of a video distribution system.

The memory 106 may include instructions that are executable by the processor 104 to cause the processor 104 to perform one or more methods at the video transmission system 102. For purposes of description, the instructions are illustrated in FIG. 1 as organized within functional modules within the memory 106. For example, the memory 106 may include a video receiver 110, a compression engine 112, a packetizer 114, and a transmission engine 116. In other embodiments, one or more functions described herein as performed by the processor 104 executing instructions from the memory 106 may instead be performed by dedicated hardware (e.g., application specific integrated circuits, programmable logic arrays and other hardware devices) or by a combination of the hardware and software.

The video receiver 110 may be executable by the processor 104 to receive a media stream that includes digital broadcast grade video. For example, the video receiver 110 may receive a media stream including digital broadcast grade video from the video camera 160 (or from a component of the video camera 160). When the video transmission system 102 is a component external to the video camera 160, the video transmission system 102 may include a video interface (not shown) that is operable to receive input associated with the media stream via one or more connectors (e.g., HDMI cables). The media stream may include the digital broadcast grade video captured during operation of the video camera 160, audio data (e.g., digital audio), user data, other related data (e.g., control data, location information, time and date information, and metadata), or any combination thereof. In another example, the media stream may be received at the video transmission system 102 from a post-production source. In a particular embodiment, the media stream includes digital broadcast grade video and digital audio and is transmitted to the video transmission system 102 from the video camera 160 or a component of the video camera 160 in real-time (i.e., as the digital broadcast grade video and digital audio is received at the video camera 160 or a component of the video camera 160, without being stored to a stored file).

The digital broadcast grade video may be compliant with a Society of Motion Picture and Television Engineers (SMPTE) 424M standard, a SMPTE 292M standard, or a SMPTE 259M standard. In a particular embodiment, the digital broadcast grade video may include high definition (e.g., at least 1080i video quality standard) 3-D video. In a particular embodiment, the digital broadcast grade video may include high definition video that satisfies a video quality standard of at least 1080p and that is compliant with the SMPTE 424M standard.

The compression engine 112 may be executable by the processor 104 to compress the media stream using a J2K compliant compression coding system to form a compressed digital media stream. The J2K compliant compression coding system supports compression of media streams that include both digital broadcast grade video and digital audio. The J2K compliant compression coding system supports compression of high definition video that satisfies the video quality standard of at least 1080p and that is compliant with the SMPTE 424M standard. In a particular embodiment, the compressed digital media stream may include the digital broadcast grade video, the digital audio, other compression-related data, or any combination thereof.

The packetizer 114 may be executable by the processor 104 to convert the compressed digital media stream into data packets (e.g., internet protocol data packets or data packets that conform to another digital communication protocol). The packetizer 114 may perform the conversion according to real-time transport protocol (RTP) standard, which defines a standardized packet format that enables delivery of audio and video over a network that supports internet protocol transmission. In a particular embodiment, the packetizer 114 performs conversion on the compressed digital media stream produced by the compression engine 112 without retrieving the compressed digital media stream from a file stored in the memory 106. That is, the compression engine 112 may provide the compressed digital media stream directly to the packetizer 114 or the compression engine 112 may store the compressed digital media stream in a buffer or cache from which the packetizer 114 reads the compressed digital media stream, without storing the compressed digital media stream in a stored file (e.g., a text file, a video file, or a metafile). Performing conversion on the compressed digital media stream without having to retrieve a stored file may reduce delay in video processing that occurs prior to transmission of the digital broadcast grade video. In a particular embodiment, the packetizer 114 may be capable of converting a plurality of compressed digital media streams into data packets. The data packets may include more than one compressed digital media stream.

The transmission engine 116 may be executable by the processor 104 to cause the data packets to be transmitted to a receiver 140 via a cellular data network 126. The cellular data network 126 may support data transmission (e.g., internet protocol data transmission). For example, the cellular data network 126 may support data transmission according to the RTP standard. Further, the cellular data network 126 may support one or more wireless cellular data communication compliant standards including code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, or any combination thereof. The cellular data network 126 may include or may be in communication with base stations 122, 132 that enable communications via the cellular data network 126. Each of the base stations 122, 132 may be communicatively coupled to the cellular data network 126, via a data communication connection 128, 138. The data communication connection 128, 138 may include a wired connection, an optical fiber connection, a wireless connection, other data connection, or any combination thereof.

The receiver 140 may be communicatively coupled to the cellular data network 126 via the wired data communication connection 138 to the base station 132 and a data communication connection 148 to the base station 132. The base station 122 may communicate the data packets to the receiver 140 via the cellular data network 126, the base station 132, or any combination thereof. The data communication connection 148 may include a wired connection, an optical fiber connection, a wireless connection, or any combination thereof.

The video transmission system 102 may include or may be operatively coupled to one or more modems, such as a representative modem 120, to transmit the data packets to the receiver 140 via the cellular data network 126. The modem 120 may include one or more wireless cellular data communication modems that support wireless cellular data communication via the cellular data network 126 according to one or more of the wireless cellular data communication compliant standards supported by the cellular data network 126. The modem 120 may be communicatively coupled to the base station 122 to facilitate a wireless cellular data communication 118 with the cellular data network 126 according to one or more of the wireless cellular data communication compliant standards supported by the cellular data network 126. In a particular embodiment, the video transmission system 102 may use the modem 120 to transmit the data packets via the cellular data network 126 by communicating with the base station 122, via the wireless cellular data communication 118. In a particular embodiment, the video transmission system 102 may utilize a single modem (e.g., the modem 120) to transmit the data packets in real-time via the cellular data network 126. Thus, in particular embodiments, the system 100 avoids the additional cost of using multiple cellular data modems to transmit data (e.g., digital broadcast grade video) to the receiver 140.

Prior to transmission of the data packets, the transmission engine 116 may analyze the wireless cellular data communication with the receiver 140 via the cellular data network 126. For example, the transmission engine 116 may establish an end-to-end link between the video transmission system 102 and the receiver 140 via the cellular data network 126 to ensure that the receiver 140 is communicatively coupled to the cellular data network 126 and is able to receive the data packets when the data packets are transmitted by the video transmission system 102. The transmission engine 116 may determine whether the wireless cellular data communication via the cellular data network 126 is suitable to transmit the data packets. For example, the transmission engine 116 may determine whether the cellular data network 126 is capable of transmitting the data packets in real-time. In a particular embodiment, the transmission engine 116 may determine whether the cellular data network 126 is capable of transmitting the data packets in real-time by determining a status of the wireless cellular data communication via the cellular data network 126 based on one or more quality of service (QoS) factors. The cellular data network may support real-time monitoring of QoS that may allow the one or more QoS factors to be determined. For example, a cellular data network (e.g., the cellular data network 126) that supports the RTP standard may permit the one or more QoS factors to be obtained using real-time transport control protocol (RTCP) messages. The QoS factors may include, but are not limited to, bandwidth, priority of traffic, throttle of traffic, latency, delay, jitter, and packet loss. In a particular embodiment of the system 100 where the video transmission system 102 transmits the data packets to the receiver 140 in real-time, the video transmission system 102 does not aggregate bandwidth of the cellular data network 126 and does not aggregate multiple data transmission streams of the cellular data network 126 to transmit the data packets to the receiver 140.

To determine whether the cellular data network 126 is capable of transmitting the data packets in real-time, the transmission engine 116 may compare one or more of the QoS factors to a QoS threshold. The QoS threshold may be user-defined or may be selected to facilitate transmission of digital broadcast grade video. For example, data transmission via a cellular data network may satisfy the QoS threshold when the cellular data network is capable of transmitting the data packets in real-time (e.g., without delay that would adversely affect video quality of digital broadcast grade video provided to the receiver 140). For example, an operator of the video transmission system 102 may define the QoS threshold and may store the QoS threshold within the memory 106 to be accessible by the transmission engine 116.

In another particular embodiment, the transmission engine 116 may determine whether the cellular data network 126 is capable of transmitting the data packets in real-time based on determining whether latency of the cellular data network 126 is below a latency threshold. The latency threshold may be user-defined and based at least in part on a latency value that may permit data transmission of digital broadcast grade video in real-time (e.g., without affecting quality of the digital broadcast grade video provided to the receiver 140) across the cellular data network 126. For example, the latency value may be selected at least in part to reduce delay that occurs during the data transmission of the digital broadcast grade video and that affects the quality of the digital broadcast grade video received by the receiver 140.

In a particular embodiment, the digital broadcast grade video includes high definition video that satisfies a video quality standard of 1080p, and the video transmission system 102 transmits the data packets via the cellular data network 126 using a single modem 120. In this embodiment, the cellular data network 126 may be 4G-LTE compliant. A 4G-LTE compliant cellular data network may provide reduced transmission delay and latency while transmitting high definition video that satisfies the video quality standard of 1080p and that has been compressed using the J2K compliant compression coding system. The digital broadcast grade video may be transmitted to the receiver 140 in real-time when transmitted in the manner specified according to this embodiment.

The receiver 140 may receive the data packets that are transmitted from the video transmission system 102 via the cellular data network 126. In a particular embodiment, the receiver 140 may include or may be a component of a broadcast station that receives the data packets from the base station 132, processes media content of the data packets, and transmits digital broadcast grade video to one or more viewers (e.g., via a television channel broadcast). The broadcast station may process the data packets to obtain the media stream including the digital broadcast grade video to be distributed via a television network. In another embodiment, the broadcast station may transmit the data packets to a production studio to be processed to obtain the media stream including the digital broadcast grade video. The data packets received at the receiver 140 may be processed to obtain the compressed digital media stream. A decompression coding system, corresponding to the J2K compliant compression coding system, may be applied to the compressed digital media stream to be decompressed to produce the media stream that includes the digital broadcast grade video. When the compressed digital media stream includes both the digital broadcast grade video and the digital audio, the media stream, produced from application of the decompression coding system, includes both the digital broadcast grade video and the digital audio.

In a particular embodiment, the video transmission system 102 is included within the video camera 160, and the modem 120 is communicatively coupled to the video camera 160. In this particular embodiment, the video camera 160 may enable a media broadcaster to transmit the media stream through the modem 120 in real-time as it is captured by the video camera 160 at a remote location. The transmission of the media stream in this manner may eliminate additional equipment or hardware needed to transmit the media stream to the receiver 140 via the cellular data network 126. Other embodiments may support that transmission of the media stream in the manner described above. In one embodiment, the video transmission system 102 and the modem 120 are included within the video camera 160. In another embodiment, the video camera 160 includes the modem and is separate from the transmission system 102. In another embodiment, the video camera is separate from the video transmission system 102, which includes the modem 120.

In operation, the video camera 160 may send the media stream including the digital broadcast grade video (and perhaps other data, such as digital audio, user data, and control data) to the video transmission system 102. For example, a camera operator may capture the digital broadcast grade video using the video camera 160, which transmits the media stream including the digital broadcast grade video to the video transmission system 102. The video receiver 110 may receive the media stream from the video camera 160. The compression engine 112 may compress the media stream to form the compressed digital media stream using the J2K compliant compression coding system. The packetizer 114 may convert the compressed digital media stream into data packets (such as internet protocol data packets) to be transmitted via the cellular data network 126. The transmission engine 116 may utilize the modem 120 to transmit the data packets to the receiver 140 via the cellular data network 126. The receiver 140 may process the data packets to obtain the media stream to distribute the digital broadcast grade video, the digital audio, the other data, or any combination thereof to a broadcast station.

Thus, the system 100 of FIG. 1 may enable a broadcast station to receive digital broadcast grade video transmitted from a remote location having access to an available cellular data network. Further, the system 100 enables real-time transmission of the digital grade broadcast video from a remote location over the cellular data network 126 by use of the J2K compliant compression coding system and subsequent conversion of the compressed digital media stream into the data packets without storing the compressed digital media stream into a stored file before the conversion.

Figure 2:
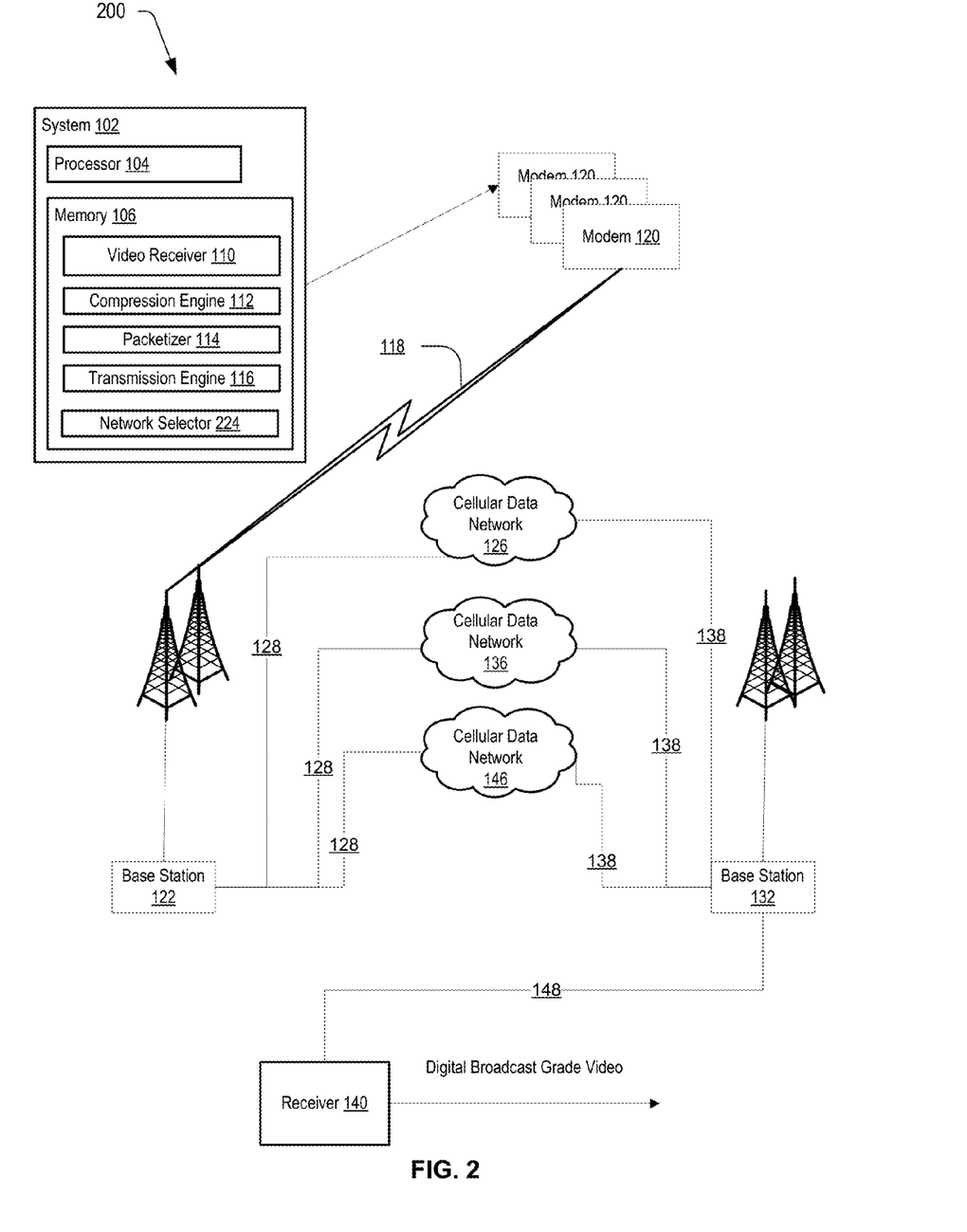
FIG. 2 is a diagram of another illustrative embodiment of a system to transmit digital broadcast grade video.

Referring to FIG. 2, another illustrative embodiment of a system to transmit digital broadcast grade video is illustrated and is designated 200. The system 200 refers to certain elements of the system 100 described with respect to FIG. 1. Additionally, the video transmission system 102 in the system 200 may select a particular cellular data network (e.g., the cellular data network 126) from a plurality of cellular data networks 126, 136, 146.

The memory 106 may include instructions that are executable by the processor 104 to cause the processor 104 to perform one or more methods at the video transmission system 102. For purposes of description, the instructions are illustrated in FIG. 2 as organized within functional modules within the memory 106 and described with respect to the video transmission system 102 of FIGS. 1 and 2. For example, the video transmission system 102 may include the memory 106 that includes a video receiver 110, a compression engine 112, a packetizer 114, and a transmission engine 116 as in FIG. 1 and FIG. 2. In another example, the memory 106 of the video transmission system 102 in FIG. 2 may further include a network selector 224. In other embodiments, one or more functions described herein as performed by the processor 104 executing instructions from the memory 106 may instead be performed by dedicated hardware (e.g., application specific integrated circuits, programmable logic arrays and other hardware devices) or by a combination of hardware and software.

The network selector 224 may be executable by the processor 104 to select a particular cellular data network from a plurality of cellular data networks 126, 136, 146 to transmit data packets (produced by the packetizer 114) to the receiver 140. The plurality of cellular data networks includes, but is not limited to, the plurality of cellular data networks 126, 136, 146 shown in the system 200.

Each of the plurality of cellular data networks 126, 136, 146 may support data transmission (e.g., internet protocol data transmission). For example, each of the plurality of cellular data networks 126, 136, 146 may support data transmission according to the RTP standard. Each of the plurality of cellular data networks 126, 136, 146 may support one or more wireless cellular data communication compliant standards including CDMA, TDMA, FDMA, OFDMA, SC-FDMA, GSM, EDGE, evolved EDGE, UMTS, Wi-Max, GPRS, 3GPP, 3GPP2, 4G, LTE, 4G-LTE, HSPA, HSPA+, or any combination thereof. Each of the plurality of cellular data networks 126, 136, 146 may include or may be in communication with base stations 122, 132 (or other base stations not shown) that enable communications via each of the plurality of cellular data networks 126, 136, 146.

Each of the base stations 122, 132 may include one or more base stations or components that enable communication via each of the plurality of cellular data networks 126, 136, 146 according to one or more of the wireless cellular data communication compliant standards. Each of the base stations 122, 132 may support communication with one or more of the plurality of cellular data networks 126, 136, 146 according to the one or more of the wireless cellular data communication compliant standards. Each of the base stations 122, 132 may be communicatively coupled to one or more of the plurality of cellular data networks 126, 136, 146 via a data communication connection 128, 138. Each data communication connection 128, 138 may include one or more data communication connections that enable communication between each of the base stations 122, 132 and each of the plurality of cellular data networks 126, 136, 146. The data communication connection 128, 138 may include a wired connection, an optical fiber connection, a wireless connection, other data connection, or any combination thereof. In a particular embodiment, each of the base stations 122, 132 may include one or more base stations or components that correspond to one or more of the plurality of cellular data networks 126, 136, 146.

The receiver 140 may be communicatively coupled to each of the plurality of cellular data networks 126, 136, 146 via the data communication connection 138 to the base station 132 and a data communication connection 148 to the base station 132. The base station 122 may communicate the data packets to the receiver 140 via one of the plurality of cellular data networks 126, 136, 146, the base station 132, or any combination thereof. The data communication connection 148 may include a wired connection, an optical fiber connection, a wireless connection, other data connection (e.g., a cellular data communication connection), or any combination thereof. The one or more of the base stations 132 may each correspond to each of the one or more wireless cellular data communication compliant standards supported by the plurality of cellular data networks 126, 136, 146.

The video transmission system 102 may include or may be operatively coupled to one or more modems 120 to transmit the data packets to the receiver 140 via one of the plurality of cellular data networks 126, 136, 146. The one or more modems 120 may include one or more wireless cellular data communication modems enabling wireless cellular data communication via each of the plurality of cellular data networks 126, 136, 146 according to the one or more wireless data communication compliant standards. Each of the one or more modems 120 may be communicatively coupled to a corresponding base station 122 to facilitate a wireless cellular data communication 118 with one of the plurality of cellular data networks 126, 136, 146. For example, the cellular data network 126 may support 4G-LTE wireless cellular data communication, the cellular data network 136 may support 4G wireless cellular data communication, the cellular data network 146 may support 3G wireless cellular data communication, and the one or more modems 120 may include a separate modem for each of 4G-LTE, 4G, and 3G. In this example, base station 122 includes a base station for each of 4G-LTE, 4G, and 3G. In a particular embodiment, the video transmission system 102 may use a selected modem of the one or more modems 120 to transmit the data packets via one of the plurality of cellular data networks 126, 136, 146 by communicating with the base station 122, via the wireless data communication 118.

During operation of the system 200, the network selector 224 may select, prior to transmission of the data packets, one of the plurality of cellular data networks 126, 136, 146 to transmit the data packets. The network selector 224 may determine whether each of the plurality of cellular data networks 126, 136, 146 is available to transmit the data packets. To determine whether each of the plurality of cellular data networks 126, 136, 146 is available, the network selector 224 may perform an analysis of the wireless cellular data communication between the video transmission system 102 and the receiver 140 via each of the plurality of the cellular data networks 126, 136, 146. The network selector 224 may utilize the one or more modems 120 to establish the wireless cellular data communication with the receiver 140 via each of the plurality of cellular data networks 126, 136, 146. For example, the network selector 224 may utilize the one or more modems 120 to establish an end-to-end link between the video transmission system 102 and the receiver 140 via each of the plurality of cellular data networks 126, 136, 146. The end-to-end link may identify each of the plurality of cellular data networks 126, 136, 146 that is able to receive the data packets. The network selector 224 may request the transmission engine 116 to establish the wireless cellular data communication between the video transmission system 102 and the receiver 140 via each of the plurality of the cellular data networks 126, 136, 146.

The network selector 224 may perform an analysis on each of the plurality of available cellular data networks 126, 136, 146 to select a particular cellular data network to transmit the data packets. The analysis of the wireless cellular data communication between the video transmission system 102 and the receiver 140 may include determining whether the wireless cellular data communication is suitable to permit transmission of the data packets. For example, the network selector 224 may determine whether one or more of the plurality of cellular data networks 126, 136, 146 is capable of transmitting the data packets in real-time. The network selector 224 may request the transmission engine 116 to perform an analysis of each of the plurality of cellular data networks 126, 136, 146 to determine which of the cellular data networks 126, 136, 146 are capable of transmitting the data packets in real-time.

To determine whether a particular cellular data is capable of transmitting the data packets in real-time, the network selector 224 may determine a status of the wireless cellular data communication between the particular cellular data network and the receiver 140 based on one or more QoS factors. The network selector 224 may request the transmission engine 116 to determine the status. Each of the plurality of cellular data networks 126, 136, 146 may support real-time monitoring of QoS that may enable the one or more QoS factors to be determined. For example, a cellular data network that supports the RTP standard may permit the one or more QoS factors to be obtained using RTCP messages. In a particular embodiment, determining whether a particular cellular data network is capable of transmitting the data packets in real-time may include comparing one or more of the QoS factors for the particular cellular data network to the QoS threshold. In another particular embodiment, determining whether the particular cellular data network is capable of transmitting the data packets in real-time may be based on determining whether latency of the particular cellular data network 126 is below the latency threshold. The network selector 224 may select a particular cellular data network (and a corresponding modem) from one of the plurality of available cellular data networks 126, 136, 146 based on a determination that the particular selected cellular data network is capable of transmitting the data packets in real-time. In a particular embodiment, the network selector 224 may select the available cellular data network that has the lowest latency among the plurality of available cellular data networks 126, 136, 146 and that is capable of transmitting the data packets in real-time. The transmission engine 116 may then transmit the data packets from the video transmission system 102 to the receiver 140 via the particular selected cellular data network.

Selecting a cellular data network based on QoS and/or real-time capability may increase a likelihood that the data packets will be transmitted in real-time. Further, selecting the cellular data network prior to actual transmission of the data packets may increase a likelihood that the particular cellular data network has sufficient bandwidth to transmit the data packets in real-time without a need to aggregate bandwidth of one or more of the plurality of cellular data networks 126, 136, 146.

After receiving the data packets from the cellular data network 126, the receiver 140 may process the data packets to obtain media content (e.g., the digital broadcast grade video) for distribution. In a particular embodiment, the receiver 140 is a broadcast station that receives the digital broadcast grade video from the data packets for distribution to one or more viewers of a television channel broadcast. By receiving the data packets in real-time (or near real-time) via the cellular data network 126, the digital broadcast grade video, in its entirety, may be obtained with little or no delay. Thus, the ability to receive the digital broadcast video in real-time (or near real-time) may enable the digital broadcast video to be distributed with minimal or no delay from remote locations.

Figure 3:
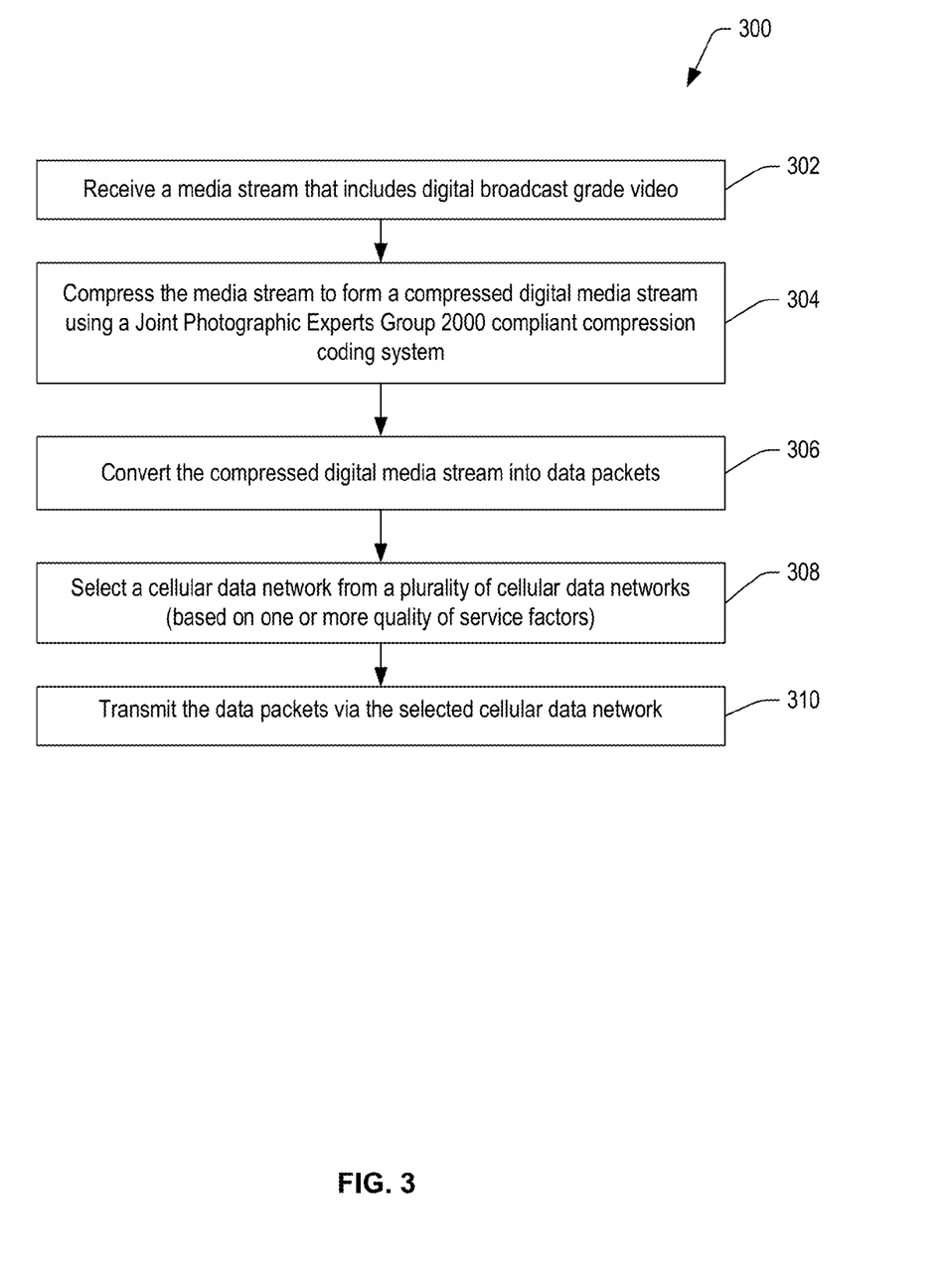
FIG. 3 is a flow chart of a particular embodiment of a method to transmit digital broadcast grade video.

Referring to FIG. 3, a particular embodiment of a method to transmit digital broadcast grade video is illustrated. The method 300 may be performed by the video transmission system 102 in FIG. 1.

At 302, the method includes receiving a media stream that includes digital broadcast grade video. For example, in FIGS. 1 and 2, the video transmission system 102 may receive a media stream that includes digital broadcast grade video, audio data (e.g., digital audio), user data, other related data (e.g., control data, location information, time and date information, and metadata tags), or any combination thereof.

At 304, the method further includes compressing the media stream to form a compressed digital media stream using a Joint Photographic Experts Group 2000 compliant compression coding system. For example, in FIGS. 1 and 2, the compression engine 112 may cause the video transmission system 102 to compress the media stream using the J2K compliant compression coding system. The compressed digital media stream formed by the compression engine 112 may include a compressed representation of the digital broadcast grade video, the digital audio, other compression-related data, or any combination thereof.

At 306, the method further includes converting the compressed digital media stream into data packets. For example, in FIGS. 1 and 2, the packetizer 114 may cause the video transmission system 102 to convert the compressed digital media stream into the data packets. The data packets may include internet protocol data packets, RTP data packets, other data packets, or any combination thereof.

At 308, the method further includes selecting a cellular data network from a plurality of available cellular data networks based on one or more QoS factors. For example, in FIG. 2, the network selector 224 may cause the video transmission system 102 to select the cellular data network 126 from the plurality of available cellular data networks 126, 136, 146 based on the one or more QoS factors. The network selector 224 may determine the one or more QoS factors by requesting the transmission engine 116 to establish wireless data communication connections between the video transmission system 102 and the receiver 140 via each of the available cellular data networks 126, 136, 146. For example, the cellular data network 126 may be selected based on having a highest value of a particular QoS factor, such as bandwidth. In another embodiment, the cellular data network 126 may be selected based on having a lowest value of a particular QoS factor, such as latency. In another embodiment, the cellular data network 126 may be selected based on data transmission within the cellular data network 126 that satisfies a QoS threshold that is user-defined based on the one or more QoS factors and that supports transmission of the data packets in real-time.

At 310, the method further includes transmitting the data packets via the selected cellular data network. For example, in FIGS. 1 and 2, the transmission engine 116 may cause the video transmission system 102 to utilize the modem 120 to transmit the data packets to the receiver 140, via the cellular data network 126. The video transmission system 102 may transmit the data packets to the cellular data network 126 via the base station 122 using the wireless cellular data communication 118. The base station 122 in turn may communicate the data packets to the cellular data network 126 to be communicated to the receiver 140.

In a particular embodiment, after receiving the data packets from the cellular data network 126, the receiver 140 may process the data packets to obtain media content (e.g., the digital broadcast grade video) for distribution. In a particular embodiment, the receiver 140 is a broadcast station that receives the digital broadcast grade video from the data packets for distribution to one or more viewers of a television channel broadcast. By receiving the data packets in real-time (or near real-time) via the cellular data network 126, the digital broadcast grade video, in its entirety, may be obtained with little or no delay. Thus, the ability to receive the digital broadcast video in real-time (or near real-time) may enable the digital broadcast video to be distributed with minimal or no delay from remote locations.

Figure 4:
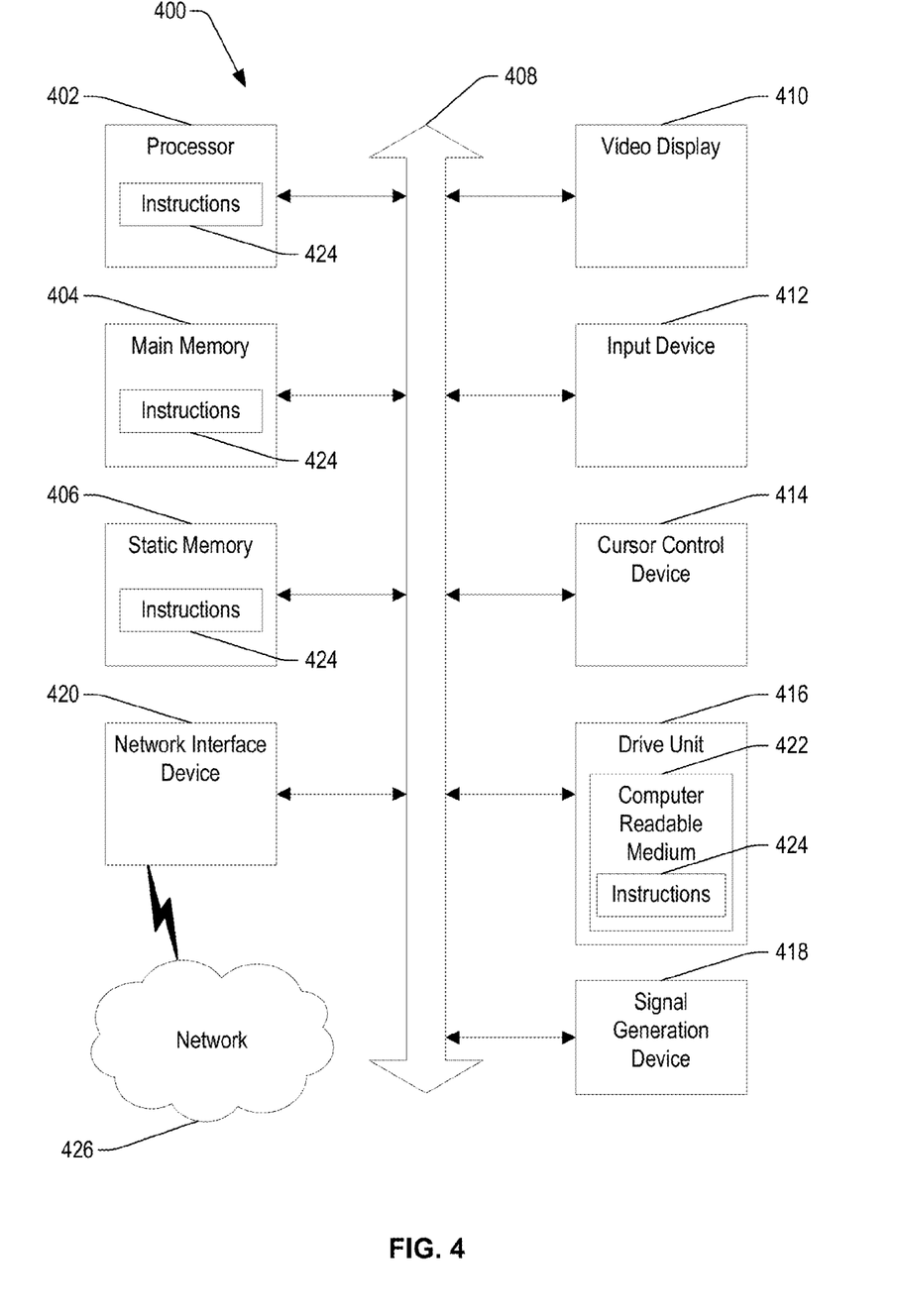
FIG. 4 is an illustration of an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 or portions thereof may operate as a standalone device or may be connected, e.g., using a network, to other computer systems or peripheral devices. For example, the general computer system 400, or portions thereof, may include or may be included within the video transmission system 102, the video camera 160, the modem 120, the base stations 122, 132, components of the cellular data network 126, the receiver 140, any combination thereof of the system 100 illustrated in FIG. 1, or any combination thereof of the system 200 illustrated in FIG. 2.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a camera, a personal trusted device, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be the processor 104 of FIGS. 1 and 2. Moreover, the computer system 400 can include a main memory 404 and a static memory 406 that can communicate with each other via a bus 408. The main memory 404, the static memory 406, or any combination thereof may be the memory 106 of the FIGS. 1 and 2. As shown, the computer system 400 may optionally include a video display unit 410, such as a liquid crystal display (LCD), an organic light emitting diode (OLED), a flat panel display, or a solid state display. Additionally, the computer system 400 may optionally include an input device 412, such as a keyboard, and a cursor control device 414, such as a mouse. The computer system 400 may also optionally include a disk drive unit 416, a signal generation device 418, such as a speaker or remote control, and a network interface device 420.

In a particular embodiment, the disk drive unit 416 may include a computer-readable medium 422 in which one or more sets of instructions 424, e.g. software, can be embedded. The instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 so that a device (e.g., the video transmission system 102 of FIGS. 1 and 2) connected to a network 426 can communicate voice, video or data over the network 426. The network 426 may be one of the plurality of cellular data networks 126, 136, 146. Further, the instructions 424 may be transmitted or received over the network 426 via the network interface device 420. The network interface device 420 may be any of the modems 120 of FIGS. 1 and 2.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible, non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for communication include RTP, TCP/IP, UDP/IP, HTML, HTTP, CDMA, TDMA, FDMA, OFDMA, SC-FDMA, GSM, EDGE, evolved EDGE, UMTS, Wi-Max, GPRS, 3GPP, 3GPP2, 4G, LTE, 4G-LTE, HSPA, HSPA+, and Institute of Electrical and Electronics Engineers (IEEE) 802.11x. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    initiating, via a first cellular data network, a first end-to-end connection between a media device and a receiver device;
    receiving, at the media device, a first message from the receiving device via the first cellular data network, the first message including a first value of a quality of service factor for the first cellular data network;
    initiating, via a second cellular data network, a second end-to-end connection between the media device and the receiver device;
    receiving, at the media device, a second message from the receiving device via the second cellular data network, the second message including a second value of the quality of service factor for the second cellular data network;
    selecting, at the media device, a single cellular data network from the first cellular data network and the second cellular data network based on the first value and the second value, wherein a first modem of a plurality of modems is associated with the single cellular data network, and wherein an unselected cellular data network from the first cellular data network and the second cellular data network is associated with a second modem of the plurality of modems;
    receiving, at the media device, a media stream including digital broadcast grade video;
    compressing, at the media device, the media stream to form a compressed digital media stream;
    converting, at the media device, the compressed digital media stream into data packets; and
    transmitting, from the media device, the data packets to the receiving device via the first modem and the single cellular data network during a transmission time period, wherein the media device does not transmit any data packet of the data packets using the second modem during the transmission time period.

2. The method of claim 1, wherein no data packet of the data packets is transmitted during the transmission time period using any modem of the plurality of modems other than the first modem.

3. The method of claim 1, wherein the first message is a real-time transport control protocol message.

4. The method of claim 1, wherein the digital broadcast grade video is Society of Motion Picture and Television Engineers 292M compliant.

5. The method of claim 1, wherein the digital broadcast grade video is Society of Motion Picture and Television Engineers 259M compliant.

6. The method of claim 1, wherein each modem of the plurality of modems is associated with a particular cellular data network.

7. The method of claim 1, wherein the data packets are transmitted without aggregating together bandwidth of the first cellular data network and the second cellular data network.

8. The method of claim 1, wherein the media stream is compressed using a Joint Photographic Experts Group 2000 compliant compression coding system.

9. The method of claim 1, wherein the data packets include packets associated with more than one compressed digital media stream that has been packetized by a packetizer.

10. The method of claim 1, wherein the quality of service factor includes packet loss.

11. The method of claim 1, wherein the media stream includes metadata tags.

12. The method of claim 1, wherein the quality of service factor relates to throttling of traffic.

13. The method of claim 1, wherein the quality of service factor is user-defined.

14. The method of claim 1, wherein the quality of service factor includes bandwidth, latency, delay, or a combination thereof.

15. The method of claim 1, wherein the quality of service factor includes priority of traffic.

16. The method of claim 1, wherein the quality of service factor includes jitter.

17. A computer-readable hardware storage device comprising instructions that, when executed by a processor, cause the processor to perform operations comprising:
   initiating, via a first wireless data network, a first end-to-end connection between the processor and a receiver device;
   receiving a first message from the receiving device via the first wireless data network, the first message including a first value of a quality of service factor for the first wireless data network;
   initiating, via a second wireless data network, a second end-to-end connection between the processor and the receiver device;
   receiving a second message from the receiving device via the second wireless data network, the second message including a second value of the quality of service factor for the second wireless data network;
   selecting a single wireless data network from the first wireless data network and the second wireless data network based on the first value and the second value, wherein a first modem of a plurality of modems is associated with the single wireless data network, and wherein an unselected wireless data network of the first wireless data network and the second wireless data network is associated with a second modem of the plurality of modems;
   receiving a media stream including digital broadcast video;
   compressing the media stream to form a compressed digital media stream;
   converting the compressed digital media stream into data packets; and
   causing the data packets to be transmitted to the receiving device via the first modem and the single wireless data network during a transmission time period, wherein the processor does not transmit any data packet of the data packets using the second modem during the transmission time period.

18. The computer-readable hardware storage device of claim 17, wherein the quality of service factor includes latency of a wireless data network.

19. A system comprising:
   a processor; and
   a memory accessible to the processor, the memory including instructions that, when executed by the processor, cause the processor to perform operations comprising:
      initiating, via a first wireless data network, a first end-to-end connection between the processor and a receiver device;
      receiving a first message from the receiving device via the first wireless data network, the first message including a first value of a quality of service factor for the first wireless data network;
      initiating, via a second wireless data network, a second end-to-end connection between the processor and the receiver device;
      receiving a second message from the receiving device via the second wireless data network, the second message including a second value of the quality of service factor for the second wireless data network;
      selecting a single wireless data network from the first wireless data network and the second wireless data network based on the first value and the second value, wherein a first modem of a plurality of modems is associated with the single wireless data network, and wherein an unselected wireless data network of the first wireless data network and the second wireless data network is associated with a second modem of the plurality of modems;
      receiving a media stream including digital broadcast video;
      compressing the media stream to form a compressed digital media stream;
      converting the compressed digital media stream into data packets; and
      causing the data packets to be transmitted to the receiving device via the first modem and the single wireless data network during a transmission time period, wherein the processor does not transmit any data packet of the data packets using the second modem during the transmission time period.

20. The system of claim 19, wherein the processor and the memory are integrated into a video camera.

* * * * *